United States Patent
Chen et al.

(10) Patent No.: US 11,310,244 B2
(45) Date of Patent: Apr. 19, 2022

(54) INFORMATION SHARING METHODS, APPARATUSES, AND DEVICES

(71) Applicant: ALIPAY (HANGZHOU) INFORMATION TECHNOLOGY CO., LTD., Zhejiang (CN)

(72) Inventors: Yuan Chen, Hangzhou (CN); Renhui Yang, Hangzhou (CN); Wenyu Yang, Hangzhou (CN); Xinmin Wang, Hangzhou (CN); Feng Qian, Hangzhou (CN); Qianting Guo, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,612

(22) Filed: Jun. 30, 2021

(65) Prior Publication Data

US 2021/0329009 A1     Oct. 21, 2021

(30) Foreign Application Priority Data

Aug. 31, 2020 (CN) .......................... 202010898593.3

(51) Int. Cl.
*H04L 29/00*     (2006.01)
*H04L 29/06*     (2006.01)
(Continued)

(52) U.S. Cl.
CPC ............ *H04L 63/126* (2013.01); *G06F 21/53* (2013.01); *H04L 9/3239* (2013.01); *H04L 9/3247* (2013.01); *H04L 63/123* (2013.01)

(58) Field of Classification Search
CPC ..... G06F 21/53; H04L 9/3247; H04L 9/3239; H04L 63/123; H04L 63/126
See application file for complete search history.

(56) References Cited

U.S. PATENT DOCUMENTS

| 10,790,979 | B1* | 9/2020 | Yu ........................ H04L 9/0838 |
| 2016/0275461 | A1* | 9/2016 | Sprague ................ H04L 9/3234 |

(Continued)

FOREIGN PATENT DOCUMENTS

| CN | 106651346 | 5/2017 |
| CN | 108494090 | 9/2018 |

(Continued)

OTHER PUBLICATIONS

Baike.baidu.com [online], "Contract," available on or before Feb. 3, 2019, retrieved on Aug. 12, 2021, retrieved from URL<https://baike.baidu.com/item/%E5%90%88%E5%90%8C/20705?fr=aladdin>, 29 pages (with machine translation).

(Continued)

*Primary Examiner* — Ghazal B Shehni
(74) *Attorney, Agent, or Firm* — Fish & Richardson P.C.

(57) ABSTRACT

Examples in this application disclose information sharing methods, media, and systems. One example computer-implemented method includes identifying, in a trusted execution environment (TEE), a transaction for invoking a smart contract, where the transaction is a first transaction initiated by a first institution or a second transaction initiated by a second institution, the first transaction comprise a first user identity of a first user and encrypted data of the first user, and the second transaction comprise a second user identity of a second user, updating accumulative invoking information for the smart contract based on the transaction, determining whether the updated accumulative invoking information satisfies an execution condition for the smart contract, executing the smart contract to obtain a user verification result to verify data of the second user, and sending the user verification result to the second institution.

17 Claims, 5 Drawing Sheets

(51) Int. Cl.
*G06F 21/53* (2013.01)
*H04L 9/32* (2006.01)

(56) References Cited

U.S. PATENT DOCUMENTS

| | | | |
|---|---|---|---|
| 2019/0095879 A1* | 3/2019 | Eyal | G06Q 20/06 |
| 2019/0228393 A1 | 7/2019 | Hu et al. | |
| 2019/0236598 A1 | 8/2019 | Padmanabhan | |
| 2020/0167503 A1* | 5/2020 | Wei | G06F 21/64 |
| 2020/0202038 A1* | 6/2020 | Zhang | G16H 50/30 |

FOREIGN PATENT DOCUMENTS

| | | |
|---|---|---|
| CN | 109615386 | 4/2019 |
| CN | 111147432 | 5/2020 |
| CN | 111368340 | 7/2020 |
| TW | I629658 | 7/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

INFORMATION SHARING METHODS, APPARATUSES, AND DEVICES

CROSS-REFERENCE TO RELATED APPLICATIONS

This application claims priority to Chinese Patent Application No. 202010898593.3, filed on Aug. 31, 2020, which is hereby incorporated by reference in its entirety.

TECHNICAL FIELD

The present specification relates to the field of Internet technologies, and in particular, to information sharing methods, apparatuses, and devices.

BACKGROUND

Data sharing is often needed by an institution to process a service. Because a single institution often cannot obtain enough information to process the service, there are needs of obtaining information from another institution. Mobility and accessibility of information (as resources) of institutions are the foundation of many data applications and industry development. However, privacy protection and trustworthiness of information during data exchange and sharing is a challenge to industry development.

Based on this, how to provide a secure and trustworthy information sharing method becomes an urgent problem that needs to be solved.

SUMMARY

Embodiments of the present specification provide information sharing methods, apparatuses, and devices, so as to improve security and trustworthiness of data in an information sharing process.

To solve the previously-mentioned technical problem, the embodiments of the present specification are implemented as described below:

Some embodiments of the present specification provide an information sharing method, where the method is applied to a privacy computing unit and includes: obtaining a target transaction, where the target transaction is a first transaction initiated by a first institution and used to invoke a target smart contract, or a second transaction initiated by a second institution and used to invoke the target smart contract, parameters of the first transaction include first user identity information of a first user and encrypted user basic data of the first user, and parameters of the second transaction include second user identity information of a second user; updating accumulative invoking information for the target smart contract based on transaction information of the target transaction, to obtain first updated accumulative invoking information; determining whether the first updated accumulative invoking information satisfies an execution condition for the target smart contract, to obtain a first determining result; if the first determining result indicates that the first updated accumulative invoking information satisfies the execution condition, executing a contract code corresponding to the target smart contract to obtain a user verification result, where the user verification result is a verification result obtained by verifying user basic data of the second user; and sending the user verification result to the second institution.

Some embodiments of the present specification provide an information sharing apparatus, where the apparatus is applied to a privacy computing unit and includes: a first acquisition module, configured to obtain a target transaction, where the target transaction is a first transaction initiated by a first institution and used to invoke a target smart contract, or a second transaction initiated by a second institution and used to invoke the target smart contract, parameters of the first transaction include first user identity information of a first user and encrypted user basic data of the first user, and parameters of the second transaction include second user identity information of a second user; a first updating module, configured to update accumulative invoking information for the target smart contract based on transaction information of the target transaction, to obtain first updated accumulative invoking information; a first determining module, configured to determine whether the first updated accumulative invoking information satisfies an execution condition for the target smart contract, to obtain a first determining result; a first execution module, configured to: if the first determining result indicates that the first updated accumulative invoking information satisfies the execution condition, execute a contract code corresponding to the target smart contract to obtain a user verification result, where the user verification result is a verification result obtained by verifying user basic data of the second user; and a first sending module, configured to send the user verification result to the second institution.

Some embodiments of the present specification provide an information sharing device, including: at least one processor; and a memory communicably coupled to the at least one processor; where the memory stores instructions that can be executed by the at least one processor, and the instructions are executed by the at least one processor, to enable the at least one processor to: obtain a target transaction, where the target transaction is a first transaction initiated by a first institution and used to invoke a target smart contract, or a second transaction initiated by a second institution and used to invoke the target smart contract, parameters of the first transaction include first user identity information of a first user and encrypted user basic data of the first user, and parameters of the second transaction include second user identity information of a second user; update accumulative invoking information for the target smart contract based on transaction information of the target transaction, to obtain first updated accumulative invoking information; determine whether the first updated accumulative invoking information satisfies an execution condition for the target smart contract, to obtain a first determining result; if the first determining result indicates that the first updated accumulative invoking information satisfies the execution condition, execute a contract code corresponding to the target smart contract to obtain a user verification result, where the user verification result is a verification result obtained by verifying user basic data of the second user; and send the user verification result to the second institution.

At least one embodiment provided in the present specification can achieve the following beneficial effects:

The privacy computing unit is enabled to generate accumulative invoking information for the target smart contract based on obtained transaction information of transactions that are initiated by the first institution and the second institution and that are used to invoke the target smart contract. After the accumulative invoking information satisfies the execution condition for the target smart contract, the contract code corresponding to the target smart contract is executed, so as to verify the user basic data sent by the first institution, and obtain a user verification result of the user requested by the second institution, so the second institution can obtain the user verification result without obtaining the user basic data from the first institution. In addition, because the user verification result generated by the privacy computing unit is obtained by verifying the user basic data sent by the first institution by using the target smart contract, trustworthiness of the user verification result can be ensured. In addition, the user basic data sent by the first institution to the privacy computing unit is encrypted, so user basic data leakage caused in a data transmission process can be avoided, and privacy of the user basic data is ensured.

BRIEF DESCRIPTION OF DRAWINGS

To describe technical solutions in the embodiments of the present specification or in the existing technology more clearly, the following briefly describes the accompanying drawings required for describing the embodiments or the existing technology. Clearly, the accompanying drawings in the following description merely show some embodiments of the present specification, and a person of ordinary skill in the art can still derive other drawings from these accompanying drawings without creative efforts.

DESCRIPTION OF EMBODIMENTS

Figure 1:
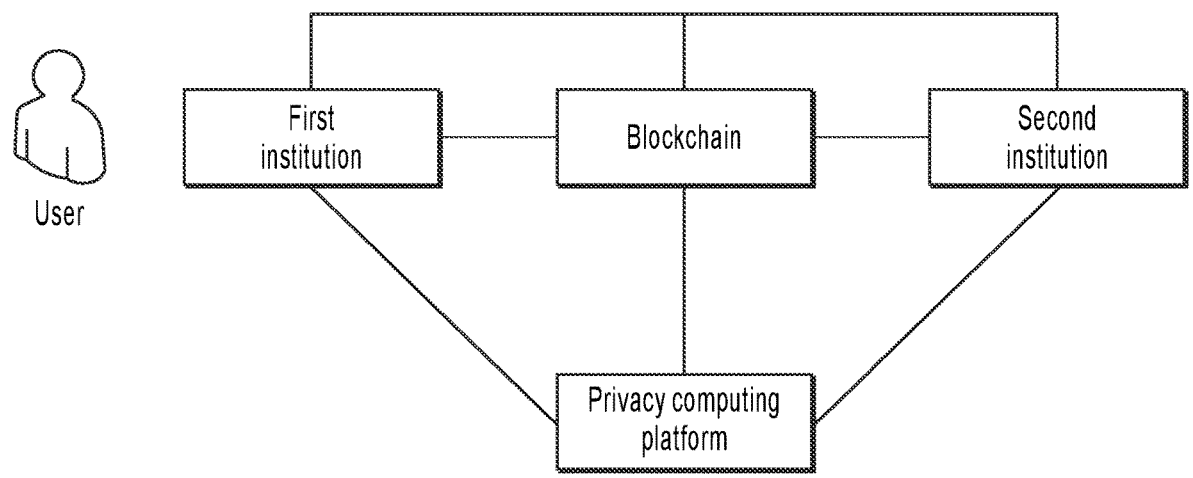
FIG. 1 is a schematic diagram illustrating an application scenario of an information sharing method, according to some embodiments of the present specification.

To make the objectives, technical solutions, and advantages of one or more embodiments of the present specification clearer, the following clearly and comprehensively describes the technical solutions of one or more embodiments of the present specification with reference to corresponding accompanying drawings and one or more specific embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of one or more embodiments of the present specification.

The technical solutions provided in the embodiments of the present specification are described in detail below with reference to the accompanying drawings.

In the existing technology, data sharing is often needed by institutions to process services. However, a single institution is often unable to obtain enough information to process a service, and needs to obtain information from other institutions. However, how to protect information privacy and trustworthiness in an information exchange and sharing process gradually becomes an urgent problem that needs to be solved.

For ease of understanding, an anti-money laundering scenario is used as an example for description.

Anti-money laundering is a measure to prevent money laundering activities that cover up and conceal sources and nature of earnings from drug crimes, organized crimes of a gangdom, terrorist crimes, smuggling crimes, corruption and bribery crimes, and crimes against financial management order by using various means. Common money laundering paths involve fields such as banking, insurances, securities, and real estate.

Since most anti-money laundering efforts require customer identity identification, a customer identity identification system emerges. The customer identity identification system, which is commonly referred to as Know Your Customer (KYC), refers to obtaining customer-related identification information, including knowing the identity of the customer when establishing a service relationship with the customer, knowing the purpose of the transaction, knowing the source and whereabouts of the capital, knowing the daily service activities and financial transactions of the customer, etc., and the customer identity identification system is the basis for anti-money laundering.

At present, there is a cooperative relationship between some financial institutions and sales agencies. A financial institution can sell its financial products through a sales agency, for example, a network platform can sell financial products of a fund company. In this case, customers who buy financial products are often customers of the sales agency. Based on the regulatory requirements, a KYC verification result for the customer is needed for financial product sales. As mentioned above, customers who purchase financial products are direct customers of a sales agency. The sales agency can directly obtain basic information of users, thus having the KYC capability. Based on requirements of data privacy protection, the sales agency usually cannot directly transfer KYC basic data and KYC verification results to a financial institution of a financial product. In addition, the financial institution does not have basic data of a user who purchases the financial product at the sales agency. Therefore, independent KYC verification cannot be performed. As a result, the financial institution cannot obtain the KYC verification result of the user and cannot meet regulation requirements. Therefore, requirements for sharing information such as the user basic data and the user verification result are generated.

A smart contract is a computer protocol that is intended to be propagated, validated or executed via information. The smart contract can be deployed on a node on a blockchain, or can be deployed on a device outside the blockchain, so different needs of a user can be satisfied. Because the smart contract can be executed accurately and reduce the risk of human intervention, people begin to share information based on the smart contract technology.

At present, the smart contract in the related technology is invoked by one contract invoker by default. However, in an actual application, there may be needs that a smart contract can be executed only when a plurality of parties jointly invoke the same smart contract. For example, when both the financial institution and the sales agency invoke the same smart contract, and each provides input parameter data that satisfies a certain condition, for example, identity information of a user whose verification result is to be obtained and user basic data, execution of the smart contract can be triggered to generate a trustworthy user verification result, so a party that does not have the user basic data can obtain a user verification result from the privacy computing unit.

Based on this, the embodiments of the present specification are intended to provide a solution that satisfies the previously-mentioned need that a plurality of parties invoke the same smart contract to share information.

To solve the defects in the existing technology, this solution provides the following embodiments:

FIG. 1 is a schematic diagram illustrating an application scenario of an information sharing method, according to some embodiments of the present specification. As shown in FIG. 1, a first institution can be directly connected to a second institution, and both the first institution and the second institution are connected to a privacy computing platform. All of the first institution, the second institution, and the privacy computing platform can be connected to a blockchain platform.

The first institution can directly receive basic data submitted by a user, so as to complete certain processing work based on the user basic data, for example, KYC verification mentioned in the KYC scenario. In addition, the first institution can further initiate a first transaction for invoking a target smart contract deployed on the privacy computing platform, so as to provide the basic data submitted by the user to the privacy computing platform, so a predetermined rule can be executed in a trusted security computing environment by using the privacy computing platform, so as to complete a task such as KYC verification.

The second institution can obtain user identity information from the first institution, and initiate a second transaction for invoking the target smart contract deployed on the privacy computing platform, so as to submit, to the privacy computing platform, the user identity information corresponding to a user verification result required by the second institution, so the privacy computing platform can generate accumulative invoking information for the target smart contract based on obtained transaction information of the first transaction and the second transaction. If the accumulative invoking information satisfies an execution condition for the target smart contract, the target smart contract is executed to generate the user verification result requested by the second institution.

It can be understood that this solution can satisfy the needs that a smart contract can be executed only when a plurality of parties jointly invoke the same smart contract. In addition, the second institution can obtain, for example, a KYC verification result of the user from the privacy computing platform, and the second institution does not need to obtain the basic data submitted by the user from the first institution, so the second institution can meet regulation requirements for KYC of the user.

Next, an information sharing method provided in the embodiments of the present specification is specifically described with reference to the accompanying drawings.

Figure 2:
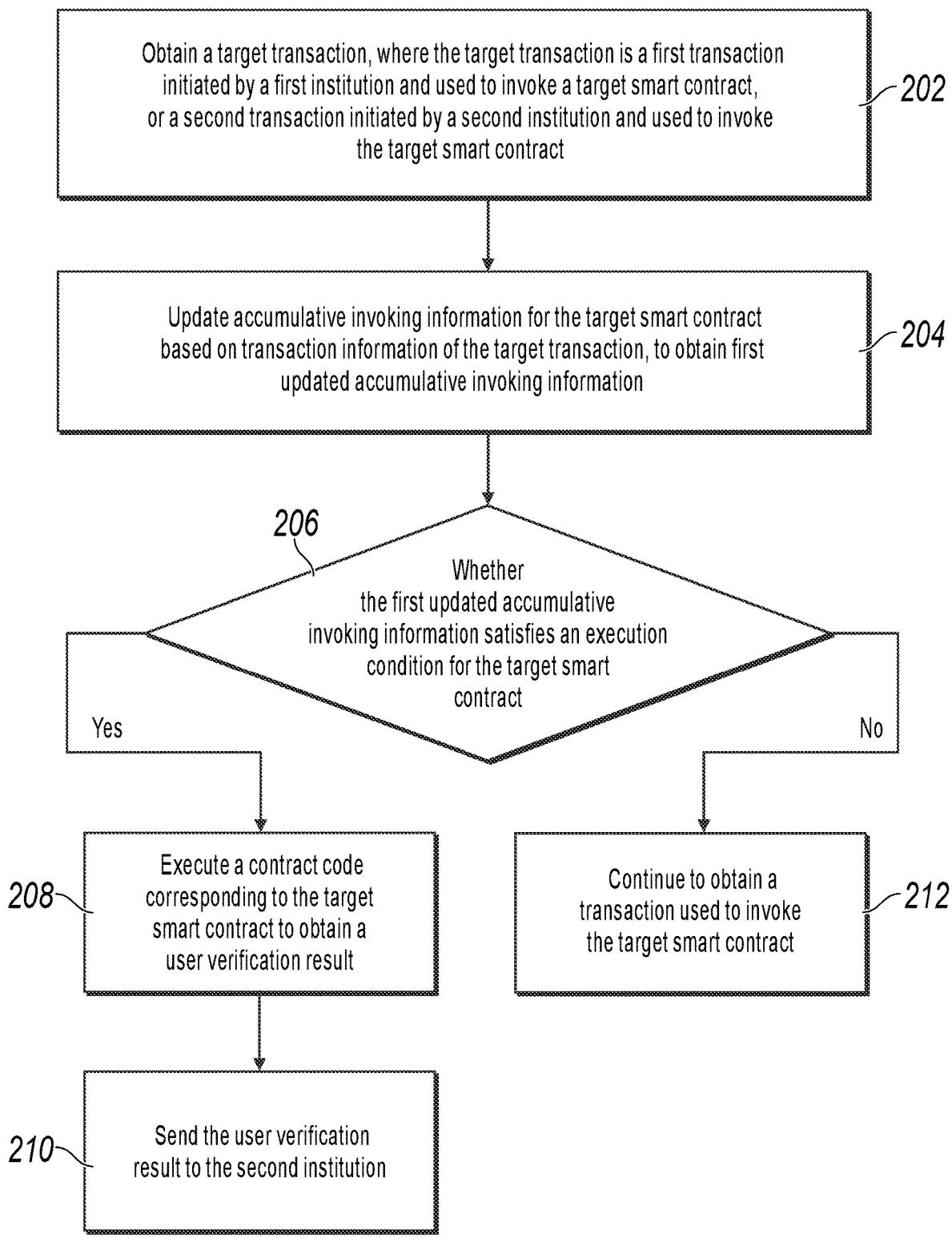
FIG. 2 is a schematic flowchart illustrating an information sharing method, according to some embodiments of the present specification.

FIG. 2 is a schematic flowchart illustrating an information sharing method, according to some embodiments of the present specification. From a program perspective, the process can be executed by a privacy computing unit on which a target smart contract is deployed. The privacy computing unit can be deployed on a blockchain, or can be deployed outside a blockchain, that is, the target smart contract can be an on-chain smart contract, or can be an off-chain smart contract.

For ease of understanding, an implementation of deploying and invoking the target smart contract in the privacy computing unit is explained.

In the embodiments of the present specification, the blockchain technology supports the user to create and invoke some complex logic in the blockchain network since Ethereum, which is one of the biggest advances of Ethereum compared with the bitcoin technology. An Ethereum virtual machine (EVM) is the core of Ethereum, which is a programmable blockchain, and each Ethereum node can run the EVM. The EVM is a Turing-complete virtual machine, through which various complex logics can be implemented. A user can deploy and invoke a smart contract by using the EVM in Ethereum. In fact, the virtual machine directly runs a virtual machine code (virtual machine bytecode, "bytecode" for short). The smart contract has a deployment phase and an invoking phase.

In the deployment phase, the user can send a transaction for creating a target smart contract to Ethereum. The data field of the transaction can include a code (such as a bytecode) of the target smart contract. The to field of the transaction is null. After diffusion and consensus of the transaction, each blockchain node in the Ethereum network can execute the transaction by using the EVM, and generate a corresponding contract instance, so as to complete deployment of the target smart contract. In this case, the blockchain can have a contract account corresponding to the target smart contract, and the contract account has a specific contract address. The contract code (that is, a code of the deployed target smart contract) or a hash value of the contract code can be stored in the contract account, and the contract code is used to control the behavior of the corresponding target smart contract.

In the invoking phase, a user (which can be the same or different from the user deploying the target smart contract) sends a transaction used to invoke the target smart contract to the Ethereum network, where the from field of the transaction is an address of a blockchain account corresponding to the user, the to field is a contract address of the target smart contract that needs to be invoked, and the data field includes a method and a parameter for invoking the target smart contract. After consensus is reached between the nodes by using the consensus mechanism, the target smart contract invoked as declared by the above transaction is independently executed on each node of the Ethereum network under regulation, and all execution records and data are stored in the blockchain. Therefore, after the transaction is completed, transaction records that cannot be tampered with and will not be lost are stored in the blockchain. With development of blockchain technologies, in addition to the EVM, many other types of virtual machines, such as WebAssembly (WASM) virtual machines, are generated.

Each blockchain node can create and invoke a smart contract by using a virtual machine. It is a challenge for privacy protection to store transactions that include the target smart contract and execution results of transactions in a blockchain ledger, or to store all ledgers on each full node in the blockchain. Privacy protection can be implemented by using a plurality of technologies, such as cryptography technologies (such as homomorphic encryption or zero-knowledge proof), hardware privacy technologies, and network isolation technologies. The hardware privacy protection technologies typically includes a trusted execution environment (TEE).

For example, the blockchain nodes can implement a secure execution environment for blockchain transactions by using the TEE. The TEE is a trusted execution environment that is based on a secure extension of CPU hardware and fully isolated from the outside. Currently, the industry attaches great importance to the TEE solution. Almost all mainstream chips and software alliances have their own TEE solutions, such as a trusted platform module (TPM) in a software aspect and Intel Software Guard Extensions (SGX), ARM Trustzone, and AMD Platform Security Processor (PSP) in a hardware aspect. The TEE can function as a hardware black box. Codes and data executed in the TEE cannot be peeped even at an operating system layer, and can be operated only by using an interface predefined in the codes. In terms of efficiency, because of the black box nature of the TEE, an operation in the TEE is performed on plaintext data instead of a complex cryptographic operation in homomorphic encryption, and efficiency of a calculation process is hardly lost. Therefore, by deploying the TEE environment on the blockchain node, privacy needs in the blockchain scenario can be satisfied to a great extent while a performance loss is relatively small.

Intel SGX (SGX for short) technology is used as an example. The blockchain node can create an enclave based on the SGX technology as a TEE for executing a blockchain transaction. The blockchain node can allocate a part of enclave page cache in a memory by using a processor instruction newly added to a CPU, so as to retain the previously-mentioned enclave. A memory area corresponding to the previously-mentioned EPC is encrypted by a memory encryption engine (MEE) in the CPU, content (codes and data in the enclave) in the memory area can be decrypted only in the CPU core, and keys used for encryption and decryption are generated and stored in the CPU only when the EPC starts. It can be understood that a security boundary of the enclave includes only itself and the CPU, neither privileged nor unprivileged software can access the enclave, and even an operating system administrator and a virtual machine monitor (VMM, or referred to as a hypervisor) is unable to affect the codes and data in the enclave. Therefore, the enclave has very high security. In addition, with the previously-mentioned security guarantee, the CPU can process a blockchain transaction in a plaintext form in the enclave, and has very high operation efficiency, so both data security and calculation efficiency are ensured. However, data that enters or exits the TEE can be encrypted, so as to ensure data privacy.

In the embodiments of the present specification, the privacy computing unit deployed on the blockchain can be, for example, a trusted execution environment (TEE) created by the blockchain node based on the SGX technology, and is used for trustworthy and secret execution of a transaction for invoking the target smart contract deployed in the TEE. Specifically, a virtual machine can be run in the TEE, so as to deploy and execute the target smart contract by using the virtual machine. As such, for an encrypted transaction for invoking the target smart contract that is sent to the privacy computing unit of the blockchain node, the privacy computing unit can decrypt and execute the encrypted transaction in the virtual machine loaded in the privacy computing unit, and can encrypt and output an execution result. The remote attestation technology in SGX can prove that it is legitimate SGX, and programs executed therein (e.g., virtual machine codes) are consistent with expectations.

Because each blockchain node creates and invokes the target smart contract deployed in the privacy computing unit by using the virtual machine, relatively more resources are consumed. In addition to executing the target smart contract by using the privacy computing unit deployed on the blockchain, to protect privacy and trustworthiness of data in the information sharing process, a privacy computing node (that is, an off-chain privacy computing node) can be deployed outside the blockchain network (or referred to as off the blockchain), and the target smart contract is deployed on the off-chain privacy computing unit, so computing operations that originally need to be performed on all blockchain nodes are transferred to the off-chain privacy computing node for execution.

An off-chain TEE created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain target smart contract and an operation of invoking the contract after the deployment by using the off-chain TEE, and ensure data security in the operation process.

Before being used, the privacy computing node can prove to a user that the privacy computing node is trustworthy. The process of proving itself trustworthy may involve a remote attestation report. The processes that the on-chain and off-chain privacy computing nodes prove themselves trustworthy are similar. Using the off-chain privacy computing node as an example, a remote attestation report is generated in a remote attestation process for the off-chain TEE on the off-chain privacy computing node. The remote attestation report can be generated after an authoritative authentication server verifies self-recommendation information generated by the off-chain privacy computing node. The self-recommendation information is related to the off-chain TEE created on the off-chain privacy computing node. The off-chain privacy computing node generates the self-recommendation information related to the off-chain TEE, and after the authoritative authentication server verifies the self-recommendation information, the remote attestation report is generated, so the remote attestation report can be used to indicate that the off-chain TEE on the off-chain privacy computing node is trustworthy. After obtaining the remote attestation report, a challenger can verify a signature of the remote attestation report based on a public key of the authoritative authentication server, and if the verification succeeds, can acknowledge that the off-chain privacy computing node is trustworthy.

The off-chain privacy computing unit can store a pair of public and private keys in the TEE. The public key can be sent to the counterpart in a process such as a remote attestation process, and the private key is properly stored in the TEE. Therefore, when it is determined, based on the remote attestation report, that the off-chain privacy computing node is trustworthy, a contract deployer (for example, a party that needs to obtain a user verification result, that is, the second institution) can send a transaction used to deploy the off-chain target smart contract to the privacy computing unit. Transaction information of the transaction can include the contract code (for example, a bytecode) of the target smart contract, description information of the target smart contract, an execution engine (for example, a virtual machine in the TEE) of the target smart contract, etc. After receiving the transaction, the off-chain privacy computing unit can store and deploy the target smart contract, and calculate a hash value of the target smart contract. The hash value of the target smart contract can be fed back to the contract deployer. The contract deployer can locally generate a hash value for the deployed target smart contract. Therefore, the contract deployer can compare whether a hash value of the deployed target smart contract is the same as the locally generated hash value. If they are the same, it indicates that the target smart contract deployed on the off-chain privacy computing node is a contract deployed by the deployer.

Actually, a plurality of smart contracts can be deployed in the TEE, and the TEE can generate a separate pair of public and private keys for each smart contract. Therefore, each deployed smart contract can have an ID (for example, a public key corresponding to the smart contract or a character string generated based on the public key), and a result of execution of each smart contract can also be signed by using a private key that is properly stored in the TEE and corresponding to the smart contract. As such, it can be proved that a result is a result of execution of a specific contract in the off-chain privacy computing node. As such, execution results of different contracts can be signed by different private keys. Only a corresponding public key can verify the signature, or if a corresponding public key cannot verify the signature, it cannot be proved that the result is an execution result of a corresponding contract. Therefore, it is equivalent to that an identity is assigned to the contract deployed in the off-chain privacy computing node by using a pair of public and private keys. The previous description uses the off-chain privacy contract as an example. The on-chain privacy contract is also similar, and can also have an identity, that is, have a pair of public and private keys.

Subsequently, the off-chain privacy computing node can invoke the deployed off-chain target smart contract. Specifically, the user can send a transaction for invoking the off-chain target smart contract to the off-chain privacy computing node. The from field of the transaction can be user identity information corresponding to the user, the to field is a hash value of the off-chain target smart contract that needs to be invoked, and the data field includes a method and a parameter for invoking the off-chain target smart contract. The TEE environment in the off-chain privacy computing unit can load and execute the bytecode of the deployed off-chain target smart contract, and an execution result can be fed back to an invoker of the contract, or fed back to a recipient specified in the contract or a recipient specified in the transaction for invoking the contract, or fed back to the blockchain node by using an oracle mechanism. The execution result fed back to the blockchain node by using the oracle mechanism can be further fed back to the recipient specified in the on-chain contract or to the recipient specified in the transaction for invoking the on-chain contract via the setting of the on-chain contract. This is not specifically limited.

As shown in FIG. 2, the process can include the following steps:

Step 202: Obtain a target transaction, where the target transaction is a first transaction initiated by a first institution and used to invoke a target smart contract, or a second transaction initiated by a second institution and used to invoke the target smart contract, parameters of the first transaction include first user identity information of a first user and encrypted user basic data of the first user, and parameters of the second transaction include second user identity information of a second user.

In the embodiments of the present specification, invoking of the target smart contract needs to be triggered by using a plurality of transactions initiated by a plurality of institutions to invoke the target smart contract, and parameters sent by different institutions to invoke the target smart contract can be different. For example, when the first institution has user basic data submitted by a user, and the second institution needs to obtain a verification result obtained by verifying the user basic data at the first institution, the transaction parameters of the first transaction sent by the first institution to invoke the target smart contract should include the user basic data and the user identity information of the first user, and the transaction parameters of the second transaction sent by the second institution to invoke the target smart contract can include the identity information of the second user whose user verification result is required by the second institution. Therefore, when the target smart contract is being executed, the user basic data in the transaction parameters of the first transaction can be verified to obtain the user verification result, and the user verification result that needs to be fed back to the second institution is determined based on the transaction parameters of the second transaction.

In practice, to prevent illegal tampering in a data transmission process, the parameters of the first transaction sent by the first institution further include a signature of the first institution, and the parameters of the second transaction sent by the second institution further include a signature of the second institution. For example, the second institution can digitally sign the sent user identity information of the second user by using a private key of the second institution. Correspondingly, the recipient (for example, the privacy computing unit here) can perform signature verification on the signature by using a public key of the second institution. If the verification succeeds, the recipient can acknowledge that the received second transaction is sent by the financial institution, and the received content is complete and not tampered with.

Step 204: Update accumulative invoking information for the target smart contract based on transaction information of the target transaction, to obtain first updated accumulative invoking information.

In the embodiments of the present specification, execution of the target smart contract can be triggered only based on a plurality of transactions used to invoke the target smart contract. Therefore, in a process of obtaining each transaction in all the transactions needed for triggering the target smart contract, transaction information of obtained each transaction is cumulated to form accumulative invoking information for the target smart contract. Therefore, each time a transaction used to invoke the target smart contract is received, the accumulative invoking information needs to be updated based on transaction information of the transaction.

In the embodiments of the present specification, the target transaction can represent a transaction currently received for invoking the target smart contract. The transaction information of the target transaction can include: identity information of a transaction initiator, parameter data included in the transaction, etc. In practice, the identity information of the transaction initiator can be determined based on the from field in the transaction. The parameter data included in the transaction can be determined based on the data field in the transaction.

In the embodiments of the present specification, accumulative invoking information generated based on transaction information of obtained one or more transactions used to invoke the target smart contract can include: parameter data included in the previously-mentioned one or more transactions, identity information of a transaction initiator of the previously-mentioned one or more transactions, an invoking sequence of the target smart contract by the previously-mentioned one or more transactions, a transaction quantity of first transactions and second transactions in the previously-mentioned one or more transactions, etc.

Step 206: Determine whether the first updated accumulative invoking information satisfies an execution condition for the target smart contract, to obtain a first determining result.

In the embodiments of the present specification, the execution condition can be set for the target smart contract, and the execution condition can be understood as a prerequisite for the privacy computing unit to execute the target smart contract. In other words, when the accumulative invoking information obtained based on transaction information of a plurality of obtained transactions used to invoke the target smart contract satisfies the execution condition, the privacy computing unit can execute the target smart contract in response to the plurality of transactions. When accumulative invoking information obtained based on transaction information of one or more obtained transactions used to invoke the target smart contract does not satisfy the execution condition, the privacy computing unit can continue to wait to receive a transaction used to invoke the target smart contract, and update the accumulative invoking information for the target smart contract based on transaction information of a subsequently received transaction used to invoke the target smart contract, so as to determine whether the updated accumulative invoking information satisfies the execution condition, and if yes, execute the target smart contract.

In the embodiments of the present specification, the execution condition for the target smart contract can be flexibly set based on actual needs. For example, the execution condition can include a data type condition of a transaction parameter, a quantity condition of a transaction parameter, an identity condition of a contract invoker, a sequence condition of transactions initiated by contract invokers, a quantity condition of transactions initiated by a contract invoker, etc.

For ease of understanding, an implementation of step 206 is described.

Specifically, step 206 can include: determining whether a transaction quantity in the first updated accumulative invoking information satisfies a transaction quantity condition defined in the execution condition.

The transaction quantity condition is that a first transaction quantity condition and a second transaction quantity condition are simultaneously established; and the first transaction quantity condition is that a transaction quantity of the first transaction reaches a third threshold; and the second transaction quantity condition is that a transaction quantity of the second transaction reaches a fourth threshold.

In the embodiments of the present specification, the third threshold and the fourth threshold can be set based on actual needs. For example, the third threshold is set to 3, and the fourth threshold is set to 4. Assume that three first transactions and three second transactions have been obtained before the target transaction is obtained. If the target transaction obtained this time is a second transaction, the first updated accumulative invoking information generated based on transaction information of the target transaction can indicate that three first transactions and four second transactions have been obtained, and the target smart contract can be executed since the execution condition is satisfied. If the target transaction is a first contract, the first updated accumulative invoking information can indicate that four first transactions and three second transactions have been obtained, and do not satisfy the execution condition. A transaction used to invoke the target smart contract needs to be continuously obtained, and the target smart contract can be executed only after one more second transaction is obtained.

After receiving a plurality of transactions used to invoke the target smart contract, the privacy computing unit generates a user verification result by executing the target smart contract, so resources consumed by executing the target smart contract at high frequency can be reduced, and resource utilization of the privacy computing unit can be improved.

Certainly, both the third threshold and the fourth threshold can be set to 1, and the target smart contract can be invoked after one first transaction and one second transaction are respectively obtained. In this implementation, a user verification result is generated in real time by using the target smart contract, so the privacy computing unit can quickly feed back the user verification result to the second institution.

Step 206 can further include: determining whether sequence information of transactions initiated by the contract invoker in the first updated accumulative invoking information satisfies the transaction sequence condition defined in the execution condition.

For example, assume that the transaction sequence condition is sequentially receiving a second transaction and a first transaction, if a transaction received before the target transaction to invoke the target smart contract is a first transaction, and the target transaction received this time is a second transaction, execution of the target smart contract can be triggered.

Step 206 can further include: determining whether transaction initiator identity information in the first updated accumulative invoking information satisfies an identity condition defined for an invoker for the target smart contract in the execution condition.

For example, the identity condition of the invoker for the target smart contract is that contract invokers include the first institution and the second institution.

If a transaction received before the target transaction to invoke the target smart contract includes a transaction initiated by a third institution except the first institution and the second institution, the target smart contract can be refused for execution even if the transactions sent by the first institution and the second institution to invoke the target smart contract are received. As such, a wrongdoer is prevented from invoking the target smart contract. Or based on the identity condition of the invoker for the target smart contract, the transactions initiated by the first institution and the second institution to invoke the target smart contract can be selected, and transactions initiated by institutions except the first institution and the second institution to invoke the target smart contract are excluded. If contract invokers corresponding to selected transactions include both the first institution and the second institution, it can be determined that the execution condition is satisfied, and the target smart contract can be executed based on transaction parameters of the selected transactions.

Step 206 can further include: determining whether transaction parameters included in the first updated accumulative invoking information satisfy a transaction parameter condition defined in the execution condition.

The transaction parameter condition can include: at least one of a first transaction parameter condition or a second transaction parameter condition is established; and the first transaction parameter condition is that a quantity of encrypted user basic data of the first user reaches a first threshold; and the second transaction parameter condition is that a quantity of second user identity information of the second user reaches a second threshold.

For example, assume that the first threshold is 100, and the second threshold is 200. Before the target transaction, if three first transactions are received, 110 pieces of user basic data of the first user are cumulated, four first transactions are received, and 180 user IDs of the second user are accumulated, if the target transaction is a second transaction that includes at least 20 user IDs of the second user, the accumulative invoking information satisfies the execution condition for the target smart contract, so the target smart contract can be executed.

After receiving a relatively large quantity of user basic data and user identity information of a user to be verified, the privacy computing unit performs the target smart contract to generate user verification data. This can reduce frequency of executing the target smart contract, thereby improving resource utilization of the privacy computing unit.

In the embodiments of the present specification, the execution condition for the target smart contract can be recorded in a contract code of the target smart contract, or recorded in a program code other than the target smart contract in codes of the privacy computing unit. This is not specifically limited.

Step 208: If the first determining result indicates that the first updated accumulative invoking information satisfies the execution condition, execute a contract code corresponding to the target smart contract to obtain a user verification result, where the user verification result is a verification result obtained by verifying user basic data of the second user.

In the embodiments of the present specification, the target smart contract can generate, based on the user basic data sent by the first institution, a user verification result corresponding to the user identity information sent by the second institution.

For ease of understanding, the KYC verification scenario is still used as an example for description.

Assume that the target smart contract is used to generate a KCY verification result of a user. When the target smart contract is being executed, the target smart contract can obtain the user identity information of the second user sent by the second institution, and determine whether the first institution sends the user basic data corresponding to the user identity information of the second user. If yes, KYC verification can be performed on the user basic data, so as to obtain the second KYC verification result.

The first user or the second user can be an individual user, an enterprise user, etc. For an individual user, the basic data of the user can include a part or all of information such as name, gender, nationality, certificate type, certificate number, age, occupation, mobile phone number, contact address, etc. of the individual. For an enterprise user, the basic data of the user can include a part or all of information such as name, business license number, business place address, name of legal representative, certificate type, certificate number, validity period, etc. of the enterprise. This is not specifically limited.

For ease of understanding, a KYC verification process of the second user being an individual user is described as an example, and can verify: whether a name format is correct, for example, whether a name includes 2 to 5 Chinese characters; whether a gender format is correct, such as male or female; whether a mobile phone number is correct, such as 11 digits, and begins with fields such as 13, 15, 17, 18, and 19; and whether a contact address is correct, for example, whether the contact address is a string of words containing the province/autonomous region/municipality to the street doorplate number. Therefore, the KYC verification result of the second user can be obtained. The KYC verification result can be specifically, for example, {user identity information, KYC verification result}. The KYC verification result is, for example, passed or failed.

Step 210: Send the user verification result to the second institution.

In the embodiments of the present specification, the privacy computing unit can directly send the user verification result to the second institution, or can send the user verification result to a specified storage service medium, which is subsequently pulled by the second institution from the storage service medium. This is not specifically limited.

It can be understood that the user verification result is shared with the second institution by using the privacy computing unit, so the second institution can also obtain the user verification result in a case that the user basic data submitted by the user at the first institution is not obtained, so as to satisfy a regulation or service requirement.

In practice, to prevent illegal tampering in a data transmission process, step 210 can specifically include: sending the user verification result digitally signed by using a private key stored in the TEE in the privacy computing unit to the second institution; or sending the user verification result digitally singed by using a corresponding private key in the target smart contract to the second institution. Therefore, after successfully verifying the signature of the user verification result, the second institution can acknowledge that the received user verification result is sent by the privacy computing unit, and received content is complete and is not tampered with.

It should be understood that, in the method described in one or more embodiments of the present specification, sequences of some steps in the method can be exchanged with each other based on actual needs, or some steps in the method can be omitted or deleted.

In the method in FIG. 2, the privacy computing unit needs to trigger execution of the target smart contract based on a plurality of transactions initiated by the first institution and the second institution to invoke the target smart contract, so as to satisfy the needs that a smart contract can be executed only when a plurality of parties jointly invoke the same smart contract. Because the user verification result generated by the privacy computing unit is obtained by verifying the user basic data sent by the first institution by using the target smart contract, trustworthiness of the user verification result can be ensured, and further, trustworthiness of the needed user verification result obtained by the second institution from the privacy computing unit can be ensured.

In the method in FIG. 2, the second institution can obtain the user verification result without obtaining the user basic data from the first institution, so as to share the user basic data and the user verification result. In addition, the user basic data sent by the first institution to the privacy computing unit is encrypted, so user basic data leakage caused in a data sharing process can be avoided, and privacy of the user basic data is ensured.

Based on the method in FIG. 2, embodiments of the present specification further provide some specific implementations of the method, which are described below.

In the embodiments of the present specification, if the first updated accumulative invoking information generated based on the obtained target transaction does not satisfy the execution condition for the target smart contract, the privacy computing unit can continue to obtain a transaction used to invoke the target smart contract, and then execute the target smart contract after accumulative invoking information generated based on transaction information of a plurality of obtained transactions used to invoke the target smart contract satisfies the execution condition.

Therefore, after the first determining result is obtained in step 206 of the method in FIG. 2, the method can further include:

Step 212: If the first determining result indicates that the first updated accumulative invoking information does not satisfy the execution condition, continue to obtain a transaction used to invoke the target smart contract.

Specifically, if the first determining result indicates that the first updated accumulative invoking information does not satisfy the execution condition, a specified transaction can be obtained, where the specified transaction is a transaction that is initiated by the first institution or the second institution after the target transaction and that is used to invoke the target smart contract;

the first updated accumulative invoking information is updated based on transaction information of the specified transaction, to obtain second updated accumulative invoking information;

whether the second updated accumulative invoking information satisfies the execution condition for the target smart contract is determined, to obtain a second determining result; and if the second determining result indicates that the second updated accumulative invoking information satisfies the execution condition, the contract code corresponding to the target smart contract is executed to obtain the user verification result.

In the embodiments of the present specification, an implementation of updating the first updated accumulative invoking information based on the transaction information of the specified transaction can be the same as an implementation of updating the accumulative invoking information for the target smart contract based on the transaction information of the target transaction. An implementation of determining whether the second updated accumulative invoking information satisfies the execution condition for the target smart contract can also be the same as an implementation of determining whether the first updated accumulative invoking information satisfies the execution condition for the target smart contract. Details are not described again.

Optionally, in the method in FIG. 2, the first institution can be a sales agency of a financial product provided by a financial institution, and the second institution can be a financial institution.

For ease of understanding, the method in FIG. 2 is applied to a KYC service scenario of anti-money laundering for description.

In the embodiments of the present specification, with its own platform or capability directly oriented to customers, the sales agency can sell the financial product provided by the financial institution. For example, a bank can sell fund products on behalf of a fund company or insurance products on behalf of an insurance institution. For another example, a payment platform can sell fund products on behalf of a fund company or insurance products on behalf of an insurance institution. Because a user can purchase the financial product provided by the financial institution through the sales agency, the sales agency can request the user to provide basic data for KYC verification, so the sales agency can obtain basic data submitted by the user. In practice, the sales agency can prompt the user to provide the basic data when the user registers, or can request the user to provide the basic data when the user initiates purchasing of a financial product by using the sales agency platform. This is not specifically limited.

In the embodiments of the present specification, most of the user basic data is sensitive and is not expected to be output outside the sales agency, so the financial institution cannot obtain the user basic data submitted by the user, and cannot perform KYC verification by itself. Therefore, the financial institution needs to directly obtain the KYC verification result of the user, and the sales agency can provide the user basic data required for KYC verification. Therefore, the first institution can be the sales agency. Correspondingly, the second institution can be the financial institution.

In the embodiments of the present specification, the first institution can allocate unique user identity information, that is, a user ID (Identity document), to a user at the first institution. For example, the user ID can be an account registered by the user at the first institution, or an account allocated to the user by a system of the first institution when the user initiates a purchase operation at the first institution. Such an account can be, for example, a character string. The user ID should specifically identify a user.

For an individual user, if an identity card is uniformly used as the certificate type, the user ID can also be an identity card number. However, the identity card number is actually also personal privacy data. Therefore, considering that personal privacy data should not be disclosed, hash processing can be performed on the identity card number. Because hash calculation has a unidirectional feature and a feature of hiding original information, and a good hash function has an anti-collision capability, that is, there is a very high probability that hash values obtained by different inputs are also different, a hash calculation result (or referred to as a digest value) can be used as a user ID. This is also the case for the mobile phone number. That is, the user ID can be a digest value obtained through hash calculation on one or more pieces of information of the user.

Similarly, hash calculation can be performed after a group of data of a user is concatenated in order, and a digest value obtained is used as a user ID, for example, a digest value obtained by hash (name+certificate type+certificate number) is used as a user ID, where "+" can represent sequential concatenation of characters beforehand and afterward. KYC in anti-money laundering generally has a relatively high need for data security. To further strengthen data security protection, a salting operation can also be performed in hash calculation, for example, hash (name+certificate type+certificate number+salt), where salt is a value generated based on a predetermined rule. It can be understood that the user ID can further be a digest value obtained through salting hash calculation on one or more pieces of information of the user.

In the embodiments of the present specification, after obtaining basic data of a user, the first institution (for example, the sales agency) can send a user ID of the user to the second institution (for example, the financial institution), so the second institution requests, on the privacy computing unit, to obtain a KYC verification result corresponding to the user ID. It can be understood that the user identity information of the second user included in the second transaction sent by the second institution can be a user ID allocated by the first institution to the second user. That is, both the user identity information of the first user and the user identity information of the second user can be implemented by using the previously-mentioned implementation of the user ID, and details are omitted here for simplicity.

In the embodiments of the present specification, the first institution can directly send the user identity information of the second user to the second institution, or can send the user identity information of the second user to the second institution by using the privacy computing unit. This is not specifically limited here. In practice, to protect security and privacy in a transmission process of the user identity information, the first institution can encrypt the user ID in a symmetric encryption or asymmetric encryption method, and then send the user ID to the second institution. If symmetric encryption is used, that is, a case that an encryption key and a decryption key are the same key, the key can be obtained through a key negotiation process between the first institution and the second institution. If asymmetric encryption is used, that is, an encryption key and a decryption key are two different but corresponding keys, one is a public key for encryption, and the another is a private key for decryption, generally, the first institution can encrypt the user ID by using a public key of the second institution, and then send the user ID to the financial institution, so the second institution decrypts the user ID by using a corresponding private key.

Similarly, the first institution and the second institution can encrypt and send the first identity information of the first user and the second identity information of the second user to the privacy computing unit by using the target transaction. Encryption principles of the first institution and the second institution for the first identity information and the second identity information can be the same as the previously-mentioned encryption principles of the user ID sent by the first institution to the second institution. Details are described again.

In the embodiments of the present specification, invoking of the target smart contract needs to be jointly completed based on a plurality of transactions initiated by a plurality of institutions. Therefore, a corresponding state machine can be configured for the target smart contract, and a final state of the state machine can correspond to the execution condition for the target smart contract. Therefore, when the accumulative invoking information for the target smart contract satisfies the execution condition, the state machine is switched to the final state, so as to automatically trigger execution of the target smart contract.

The state machine corresponding to the target smart contract can be disposed in a chain code of the blockchain node that the privacy computing unit is located, or can be disposed in a contract code of the target smart contract, or can be disposed in a contract account of the target smart contract, or is disposed in a program code other than the contract code of the target smart contract in the privacy computing unit. This is not specifically limited.

Specifically, the method in FIG. 2 can further include:

if the first determining result indicates that the first updated accumulative invoking information satisfies the execution condition, switching a state machine corresponding to the target smart contract to a final state, where the final state is used to instruct to execute the contract code of the target smart contract.

In practice, if the first determining result indicates that the first updated accumulative invoking information does not satisfy the execution condition, an intermediate state that the state machine corresponding to the target smart contract is located can be determined based on the first updated accumulative invoking information. The intermediate state can indicate to continuously receive transactions used to invoke the target smart contract, so as to determine whether to execute the target smart contract based on a transaction subsequently received.

In an actual application, the state machine can include one or more intermediate states, and different intermediate states are configured with corresponding different intermediate state conditions, so an intermediate state that the state machine corresponding to the target smart contract needs to be switched to can be determined based on a determined intermediate state condition that the first updated accumulative invoking information satisfies.

For ease of understanding, the information sharing solution provided in the embodiments of the present specification is still described by using the KYC verification scenario as an example.

For example, assume that two intermediate states and one final state are configured for the state machine of the target smart contract. The following table shows corresponding predetermined state conditions configured for the intermediate states and the final state of the state machine. The predetermined state condition configured for the final state is the execution condition for the target smart contract.

| Predetermined state condition | State of the state machine |
| --- | --- |
| The first institution submits the ID of the first user and the user basic data of the first user. | Intermediate state 1 |
| The second institution submits the ID of the second user. | Intermediate state 2 |
| The first institution submits the ID of the first user and the user basic data of the first user. The second institution submits the ID of the second user. | Final state |

Assume that a transaction submitted by the second institution and including the ID of the second user to invoke the target smart contract is currently received, the accumulative invoking information for the target smart contract can be updated to "The second institution submits the ID of the second user". In this case, the state machine corresponding to the target smart contract can be switched from the initial state to intermediate state 2.

Then, if a transaction submitted by the first institution and including the ID of the first user and the user basic data of the first user to invoke the target smart contract is continually received, the accumulative invoking information can be updated to "The second institution submits the ID of the second user; and the first institution submits the ID of the first user and the user basic data of the first user." In this case, the state machine corresponding to the target smart contract can be switched from intermediate state 2 to the final state, so the target smart contract can be executed to perform KYC verification on the user basic data corresponding to the ID of the second user, to obtain a user verification result.

In practice, when accumulative invoking information generated based on transaction information of a received transaction used to invoke the target smart contract does not satisfy any predetermined state condition for the state machine, it can indicate that a problem exists in the received transaction used to invoke the target smart contract. For example, the transaction is a transaction sent by an institution other than the first institution and the second institution, that is, an illegal institution invokes the target smart contract, and therefore, error reporting information can be output. This helps a management party of the privacy computing unit to monitor the use process of the target smart contract. In this case, the state machine corresponding to the target smart contract can be reset to the initial state, helping improve security of the use process of the target smart contract.

In the embodiments of the present specification, to further improve security of data transmission, that is, although encrypted data is transmitted, an incorrect recipient is not expected to receive the data. Therefore, before the first institution and the second institution send the target transaction to the privacy computing unit, the privacy computing unit further needs to prove an identity of the privacy computing unit to the second institution. Before sending the user verification result to the second institution, the privacy computing unit can further first acknowledge an identity of the counterpart, which is the second institution, that is, determine that the second institution is an institution satisfying a predetermined condition.

In the embodiments of the present specification, there are several methods for determining the identity of the counterpart. An implementation of using a distributed digital identity technology combined with a blockchain is listed here. A blockchain can provide a decentralized (or weakly centralized), non-tampering (or difficult to tamper with), trusted distributed ledger, and can provide a secure, stable, transparent, auditable, and efficient method of recording transactions and data information interaction. A blockchain network can include a plurality of nodes. Generally, one or more nodes of the blockchain belong to one participant. Generally, the more participants in a blockchain network, the more authoritative the participants are, the more trustworthy the blockchain network is. Here, a blockchain network formed by a plurality of participants is referred to as a blockchain platform. The blockchain platform can help verify the identity of each institution.

The same principle can be used in an identity verification process between the privacy computing unit and each of the first institution and the second institution. Therefore, for ease of understanding, an example that the privacy computing unit verifies the identity of the second institution (that is, the financial institution) is used here for description.

In order to use the distributed digital identity service provided by the blockchain platform, the financial institution can register its identity in the blockchain platform. For example, the financial institution can create a pair of public and private keys, secretly store the private key, and can create a distributed digital identity (also referred to as a decentralized identifier, DID). In practice, the financial institution can create the DID by itself, or can request a decentralized identity service (DIS) system to create the DID. The DIS is a blockchain-based identity management solution that provides functions such as creating, verifying, and managing digital identities, so as to manage and protect entity data under regulation, ensure authenticity and efficiency of information flow, and solve problems such as cross-institution identity authentication and data cooperation. The DIS system can be connected to the blockchain platform. A DID can be created for the financial institution by using the DIS system, the DID and the public key are sent to the blockchain platform for storage, and the created DID is further returned to the financial institution. The public key can be included in DIDdoc, which can be stored in the blockchain platform. The DIS can create the DID for the financial institution based on the public key sent by the financial institution. For example, the DID is created after the public key of the financial institution is calculated by using the hash function, or can be created based on other information of the financial institution (which can include the public key or not include the public key). The latter case may need the financial institution to provide information other than the public key. Afterward, the financial institution can provide a verification function to prove to other parties that it is the financial institution.

Figure 3:
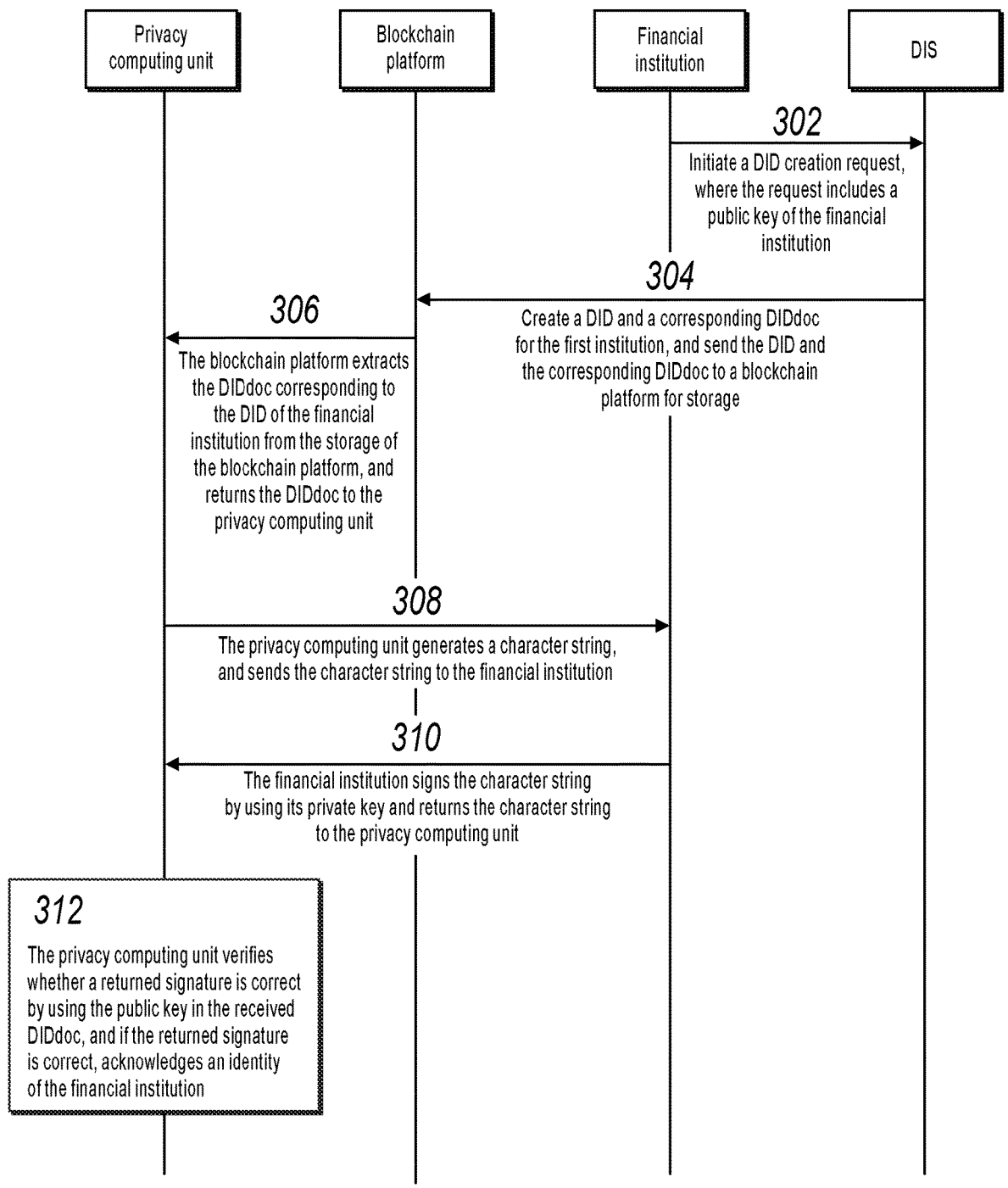
FIG. 3 is a schematic flowchart illustrating a method for verifying, by a privacy computing unit, an identity of a financial institution, according to some embodiments of the present specification.

FIG. 3 is a schematic flowchart illustrating a method for verifying, by a privacy computing unit, an identity of a financial institution, according to some embodiments of the present specification, as shown in FIG. 3.

Step 302: The financial institution initiates a DID creation request to a DIS, where the request includes a public key of the financial institution.

Step 304: In response to the creation request, the DIS creates a DID and a corresponding DIDdoc for the financial institution, and sends the DID and the corresponding DIDdoc to a blockchain platform for storage, where the DIDdoc includes the public key of the financial institution.

Step 306: The blockchain platform receives a verification request sent by the privacy computing unit, where the verification request includes the DID of the financial institution; and the blockchain platform extracts the DIDdoc corresponding to the DID of the financial institution from the storage of the blockchain platform, and returns the DIDdoc to the privacy computing unit.

Step 308: The privacy computing unit generates a character string, and sends the character string to the financial institution.

Step 310: The financial institution signs the character string by using its private key and returns the character string to the privacy computing unit.

Step 312: The privacy computing unit verifies whether a returned signature is correct by using the public key in the previously received DIDdoc, and if the returned signature is correct, acknowledges the identity of the financial institution. Therefore, it can be determined whether the financial institution is an institution satisfying a predetermined regulation.

It can be understood that the procedure in FIG. 3 enables the privacy computing unit to verify the identity of the financial institution. There is no strict sequence between S306 and S308 and S310. This is not specifically limited.

In the embodiments of the present specification, the privacy computing unit can further send a proof of the user verification result to the blockchain for subsequent use.

Therefore, the method in FIG. 2 can further include: sending a proof of the user verification result to a blockchain network. A blockchain network that stores the proof of the user verification result and the blockchain network that the privacy computing platform is deployed can be the same blockchain network, or can be different blockchain networks. This is not specifically limited here.

The proof of the user verification result can include a verifiable claim (VC) signed by the privacy computing unit. The VC is also an important application in the DID. The VC can be stored on the blockchain platform. For example, content of the VC includes that user basic data corresponding to a user ID/some user IDs has been verified by the privacy computing unit based on a predetermined rule, and is signed by the privacy computing unit; or includes a hash value of the user verification result, which is signed by the privacy computing unit. That is, the proof of the verification result can include: a verifiable claim signed by the privacy computing unit, or a hash value signed by the privacy computing unit, where the hash value is a hash value obtained by performing hash calculation on the user verification result.

When the method in FIG. 2 is applied to the KYC verification scenario, when examining, for example, the KYC verification result of the user by the second institution, the regulatory organization can verify the VC by using the blockchain in addition to obtaining the KYC verification result of the user from the second institution. Specifically, when obtaining the public key in the DIDdoc of the privacy computing unit from the blockchain, and verifying the KYC verification result of the user ID of the second institution, the regulatory organization can further verify the signature of the VC by using the public key of the privacy computing unit, so as to acknowledge that the VC is issued by the privacy computing unit and is complete, that is, the VC is not tampered with. As such, authenticity acknowledgement of the KYC verification result provided by the second institution can be improved based on a non-tampering feature of the blockchain platform and trustworthiness of a signing institution. The trustworthiness of the signing institution, that is, the trustworthiness of the privacy computing unit or the target smart contract, can be implemented by auditing the identity of the privacy computing unit and the contract code deployed therein. The identity of the privacy computing unit is audited, for example, the previously-mentioned challenge initiation process can verify that the identity of the privacy computing unit is trustworthy.

As such, by using the solution in the previously-mentioned embodiment, an institution that originally does not have the capability to perform anti-money laundering work can be empowered, so such an institution (for example, the second institution, that is, the financial institution) can have a KYC verification result of a user who purchases a financial product of the institution, thereby satisfying a specified anti-money laundering audit obligation, and improving an overall KYC verification capability of the industry.

Figure 4:
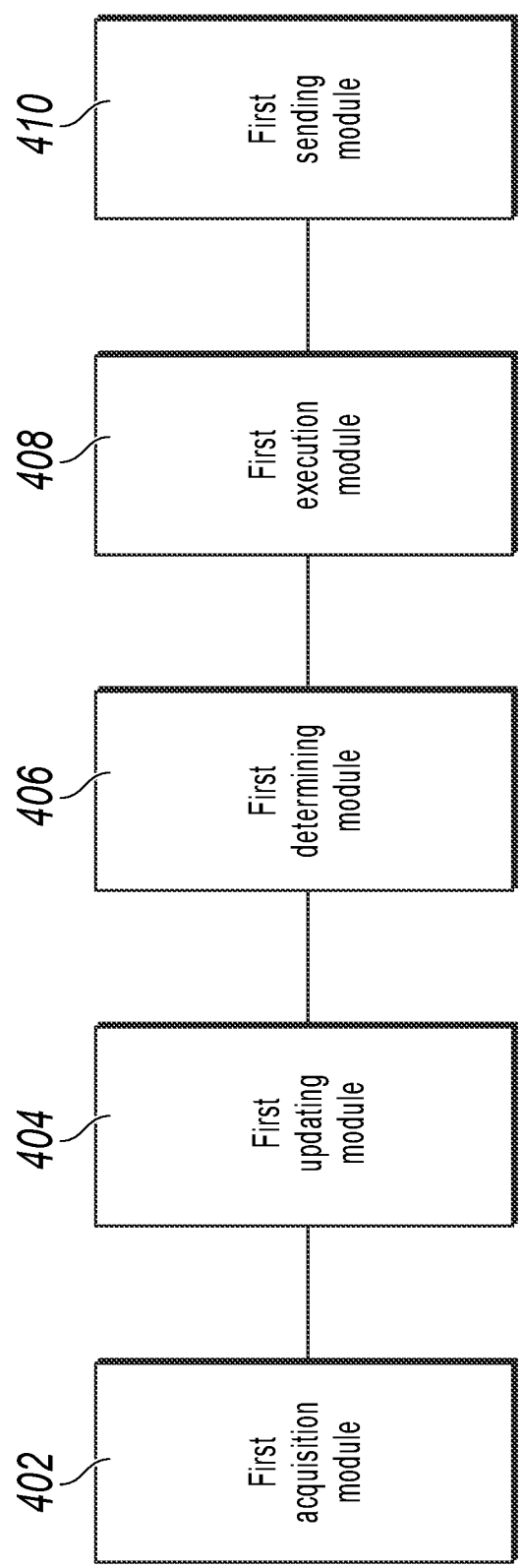
FIG. 4 is a schematic structural diagram illustrating an information sharing apparatus corresponding to FIG. 2, according to some embodiments of the present specification.

Based on the same idea, some embodiments of the present specification further provide apparatuses that correspond to the previously-mentioned method. FIG. 4 is a schematic structural diagram illustrating an information sharing apparatus corresponding to FIG. 2, according to some embodiments of the present specification. The apparatus can be applied to a privacy computing unit. As shown in FIG. 4, the apparatus can include:

a first acquisition module 402, configured to obtain a target transaction, where the target transaction is a first transaction initiated by a first institution and used to invoke a target smart contract, or a second transaction initiated by a second institution and used to invoke the target smart contract, parameters of the first transaction include first user identity information of a first user and encrypted user basic data of the first user, and parameters of the second transaction include second user identity information of a second user;

a first updating module 404, configured to update accumulative invoking information for the target smart contract based on transaction information of the target transaction, to obtain first updated accumulative invoking information;

a first determining module 406, configured to determine whether the first updated accumulative invoking information satisfies an execution condition for the target smart contract, to obtain a first determining result;

a first execution module 408, configured to: if the first determining result indicates that the first updated accumulative invoking information satisfies the execution condition, execute a contract code corresponding to the target smart contract to obtain a user verification result, where the user verification result is a verification result obtained by verifying user basic data of the second user; and a first sending module 410, configured to send the user verification result to the second institution.

Optionally, the first institution is a sales agency, and the second institution is a financial institution.

Optionally, the first user identity information includes: an account registered by the first user at the first institution; or an account allocated to the first user by a system of the first institution when the first user initiates a purchase operation at the first institution; and the second user identity information includes: an account registered by the second user at the first institution; or an account allocated to the second user by the system of the first institution when the second user initiates a purchase operation at the first institution.

Optionally, the second user identity information is user identity information of the second user that is sent by the first institution to the second institution after the first institution obtains the user basic data of the second user.

Optionally, the first user identity information includes a digest value obtained through hash calculation on one or more pieces of information of the first user; and the second user identity information includes a digest value obtained through hash calculation on one or more pieces of information of the second user.

Optionally, the first user identity information includes a digest value obtained through salting hash calculation on one or more pieces of information of the first user; and the second user identity information includes a digest value obtained through salting hash calculation on one or more pieces of information of the second user.

Optionally, the first acquisition module 402 can be specifically configured to:

obtain the target transaction by using the privacy computing unit deployed on a blockchain; or obtain the target transaction by using the privacy computing unit deployed off a blockchain.

Optionally, the apparatus in FIG. 4 can further include:

a first proving module, configured to prove, by the privacy computing unit, an identity of the privacy computing unit to the first institution; and a second proving module, configured to prove, by the privacy computing unit, the identity of the privacy computing unit to the second institution.

Optionally, the parameters of the first transaction further include a signature of the first institution; and the parameters of the second transaction further include a signature of the second institution.

Optionally, the first user identity information included in the parameters of the first transaction is encrypted; and the second user identity information included in the parameters of the second transaction is encrypted.

Optionally, the first determining module 406 can be specifically configured to:

determine whether transaction parameters included in the first updated accumulative invoking information satisfy a transaction parameter condition defined in the execution condition.

Optionally, the transaction parameter condition includes: at least one of a first transaction parameter condition or a second transaction parameter condition is established; and the first transaction parameter condition is that a quantity of encrypted user basic data of the first user reaches a first threshold; and the second transaction parameter condition is that a quantity of second user identity information of the second user reaches a second threshold.

Optionally, the first determining module 406 can be specifically configured to:

determine whether transaction initiator identity information in the first updated accumulative invoking information satisfies an identity condition defined for an invoker for the target smart contract in the execution condition.

Optionally, the first determining module 406 can be specifically configured to:

determine whether a transaction quantity in the first updated accumulative invoking information satisfies a transaction quantity condition defined in the execution condition.

Optionally, the transaction quantity condition is that a first transaction quantity condition and a second transaction quantity condition are simultaneously established; and the first transaction quantity condition is that a transaction quantity of the first transaction reaches a third threshold; and the second transaction quantity condition is that a transaction quantity of the second transaction reaches a fourth threshold.

Optionally, the third threshold is equal to 1, and the fourth threshold is equal to 1.

Optionally, the apparatus in FIG. 4 can further include:

a second acquisition module, configured to: if the first determining result indicates that the first updated accumulative invoking information does not satisfy the execution condition, obtain a specified transaction, where the specified transaction is a transaction that is initiated by the first institution or the second institution after the target transaction and that is used to invoke the target smart contract;

a second updating module, configured to update the first updated accumulative invoking information based on transaction information of the specified transaction, to obtain second updated accumulative invoking information;

a second determining module, configured to determine whether the second updated accumulative invoking information satisfies the execution condition for the target smart contract, to obtain a second determining result; and a second execution module, configured to: if the second determining result indicates that the second updated accumulative invoking information satisfies the execution condition, execute the contract code corresponding to the target smart contract to obtain the user verification result.

Optionally, the first sending module 410 can be specifically configured to:

send the user verification result digitally signed by the privacy computing unit to the second institution; or send the user verification result digitally signed by the target smart contract to the second institution.

Optionally, the apparatus in FIG. 4 can further include:

a determining module, configured to determine that the second institution is an institution satisfying a predetermined condition.

Optionally, the apparatus in FIG. 4 can further include:

a second sending module, configured to send a proof of the user verification result to a blockchain network.

Optionally, the proof of the user verification result includes: a verifiable claim signed by the privacy computing unit, or a hash value signed by the privacy computing unit, where the hash value is a hash value obtained by performing hash calculation on the user verification result.

Optionally, the apparatus in FIG. 4 can further include:

a state switching module, configured to: if the first determining result indicates that the first updated accumulative invoking information satisfies the execution condition, switch a state machine corresponding to the target smart contract to a final state, where the final state is used to instruct to execute the contract code of the target smart contract; and a state determining module, configured to: if the first determining result indicates that the first updated accumulative invoking information does not satisfy the execution condition, determine, based on the first updated accumulative invoking information, an intermediate state that the state machine corresponding to the target smart contract is located.

Based on the same idea, embodiments of the present specification further provide devices that correspond to the previously-mentioned method.

Figure 5:
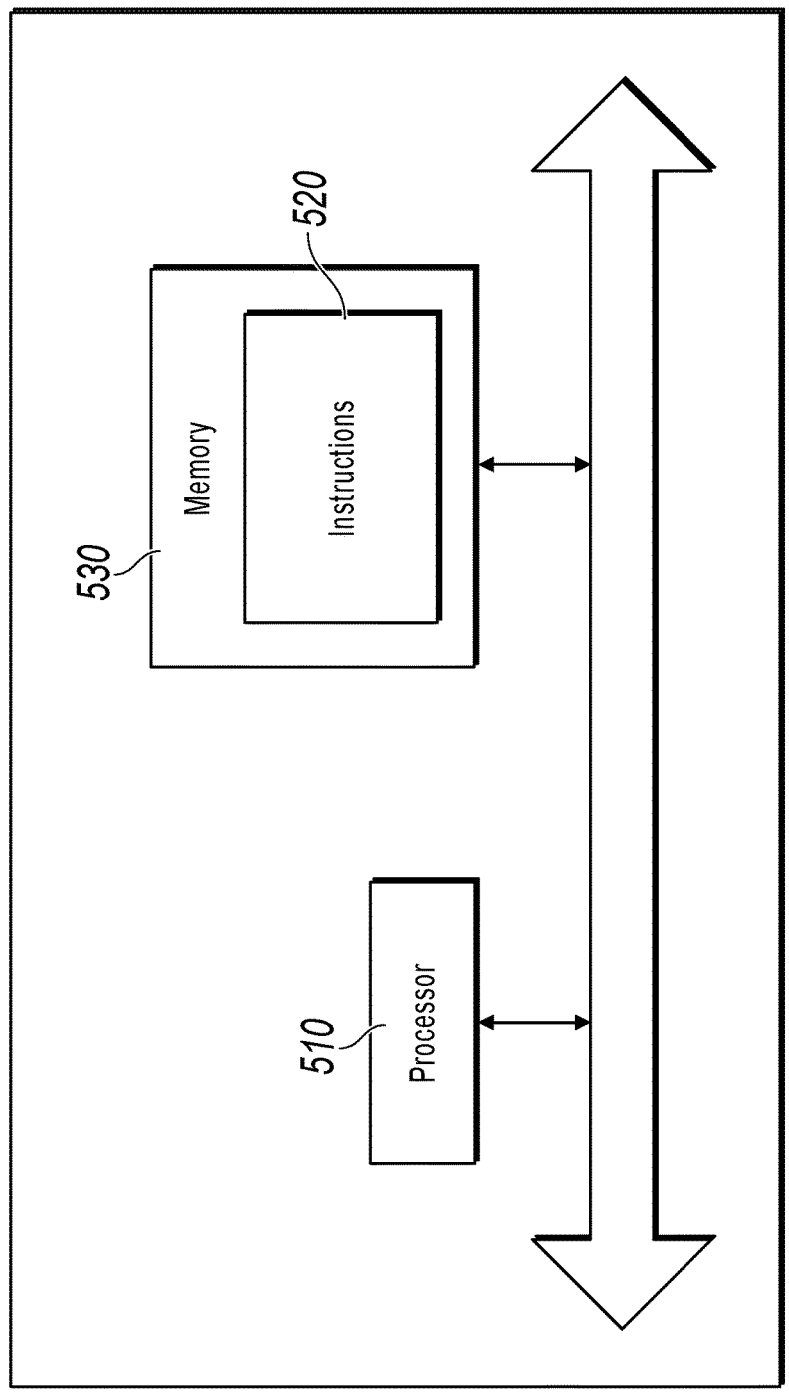
FIG. 5 is a schematic structural diagram illustrating an information sharing device corresponding to FIG. 2, according to some embodiments of the present specification.

FIG. 5 is a schematic structural diagram illustrating an information sharing device corresponding to FIG. 2, according to some embodiments of the present specification. As shown in FIG. 5, the device 500 can include:

at least one processor 510; and a memory 530 communicably coupled to the at least one processor; where the memory 530 stores instructions 520 that can be executed by the at least one processor 510, where the instructions 520 can be instructions in a privacy computing unit, and the instructions 520 are executed by the at least one processor 510, so the at least one processor 510 can:

obtain a target transaction, where the target transaction is a first transaction initiated by a first institution and used to invoke a target smart contract, or a second transaction initiated by a second institution and used to invoke the target smart contract, parameters of the first transaction include first user identity information of a first user and encrypted user basic data of the first user, and parameters of the second transaction include second user identity information of a second user;

update accumulative invoking information for the target smart contract based on transaction information of the target transaction, to obtain first updated accumulative invoking information;

determine whether the first updated accumulative invoking information satisfies an execution condition for the target smart contract, to obtain a first determining result;

if the first determining result indicates that the first updated accumulative invoking information satisfies the execution condition, execute a contract code corresponding to the target smart contract to obtain a user verification result, where the user verification result is a verification result obtained by verifying user basic data of the second user; and send the user verification result to the second institution.

The embodiments in the present specification are described in a progressive way. For same or similar parts of the embodiments, references can be made to the embodiments. Each embodiment focuses on a difference from other embodiments. Especially, the device shown in FIG. 5 are basically similar to method embodiments, and therefore are described briefly; for related parts, reference can be made to some descriptions in the method embodiments.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, current improvements of many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the previously-mentioned several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously-mentioned embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that embodiments of the present disclosure can be provided as methods, systems, or computer program products. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include anon-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computer device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that embodiments of the present specification can be provided as methods, systems, or computer program products. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The previously-mentioned descriptions are merely embodiments of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

What is claimed is:

1. A computer-implemented method, comprising:
    identifying, in a trusted execution environment (TEE), a transaction for invoking a smart contract, wherein the transaction is a first transaction initiated by a first institution or a second transaction initiated by a second institution, and wherein parameters of the first transaction comprise a first user identity of a first user and encrypted data of the first user, and parameters of the second transaction comprise a second user identity of a second user;
    updating accumulative invoking information for the smart contract based on the transaction, to obtain updated accumulative invoking information;
    setting a first threshold for an amount of user identities received in the updated accumulative invoking information;
    determining that the updated accumulative invoking information satisfies an execution condition for the smart contract in response to determining that the amount of the user identities reaches the first threshold;
    in response to determining that the updated accumulative invoking information satisfies the execution condition, executing the smart contract to obtain a user verification result, wherein the user verification result is obtained by executing the smart contract to verify data of the second user; and
    sending the user verification result to the second institution.

2. The computer-implemented method of claim 1, wherein the first user identity comprises a first account registered by or assigned to the first user by the first institution in response to the first user initiating an operation at the first institution, and wherein the second user identity comprises a second account registered by or assigned to the second user by the first institution in response to the second user initiating an operation at the first institution.

3. The computer-implemented method of claim 1, wherein determining that the updated accumulative invoking information satisfies the execution condition comprises:
    determining whether transaction parameters of the updated accumulative invoking information satisfy a transaction parameter condition comprised in the execution condition; and
    in response to determining that the transaction parameters of the updated accumulative invoking information satisfy the transaction parameter condition, executing the smart contract.

4. The computer-implemented method of claim 1, wherein determining that the updated accumulative invoking information satisfies the execution condition comprises:
    determining whether transaction initiator identity information in the updated accumulative invoking information satisfies an identity condition comprised in the execution condition, wherein the transaction initiator identity information is associated with an invoker for the smart contract.

5. The computer-implemented method of claim 1, wherein determining that the updated accumulative invoking information satisfies the execution condition comprises:
    setting a second threshold for an amount of transactions received in the updated accumulative invoking information; and
    determining whether the amount of the transactions reaches the second threshold.

6. The computer-implemented method of claim 1, wherein the first user identity comprises a first digest value obtained through a hash calculation on one or more pieces of information of the first user; and wherein the second user identity comprises a second digest value obtained through the hash calculation on one or more pieces of information of the second user.

7. A non-transitory, computer-readable medium storing one or more instructions executable by a computer system to perform operations comprising:
    identifying, in a trusted execution environment (TEE), a transaction for invoking a smart contract, wherein the transaction is a first transaction initiated by a first institution or a second transaction initiated by a second institution, and wherein parameters of the first transaction comprise a first user identity of a first user and encrypted data of the first user, and parameters of the second transaction comprise a second user identity of a second user;
    updating accumulative invoking information for the smart contract based on the transaction, to obtain updated accumulative invoking information;

setting a first threshold for an amount of user identities received in the updated accumulative invoking information;

determining that the updated accumulative invoking information satisfies an execution condition for the smart contract in response to determining that the amount of the user identities reaches the first threshold;

in response to determining that the updated accumulative invoking information satisfies the execution condition, executing the smart contract to obtain a user verification result, wherein the user verification result is obtained by executing the smart contract to verify data of the second user; and sending the user verification result to the second institution.

8. The non-transitory, computer-readable medium of claim 7, wherein the first user identity comprises a first account registered by or assigned to the first user by the first institution in response to the first user initiating an operation at the first institution, and wherein the second user identity comprises a second account registered by or assigned to the second user by the first institution in response to the second user initiating an operation at the first institution.

9. The non-transitory, computer-readable medium of claim 7, wherein determining that the updated accumulative invoking information satisfies the execution condition comprises:

determining whether transaction parameters of the updated accumulative invoking information satisfy a transaction parameter condition comprised in the execution condition; and in response to determining that the transaction parameters of the updated accumulative invoking information satisfy the transaction parameter condition, executing the smart contract.

10. The non-transitory, computer-readable medium of claim 7, wherein determining that the updated accumulative invoking information satisfies the execution condition comprises:

determining whether transaction initiator identity information in the updated accumulative invoking information satisfies an identity condition comprised in the execution condition, wherein the transaction initiator identity information is associated with an invoker for the smart contract.

11. The non-transitory, computer-readable medium of claim 7, wherein determining that the updated accumulative invoking information satisfies the execution condition comprises:

setting a second threshold for an amount of transactions received in the updated accumulative invoking information; and determining whether the amount of the transactions reaches the second threshold.

12. The non-transitory, computer-readable medium of claim 7, wherein the first user identity comprises a first digest value obtained through a hash calculation on one or more pieces of information of the first user; and wherein the second user identity comprises a second digest value obtained through the hash calculation on one or more pieces of information of the second user.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

identifying, in a trusted execution environment (TEE), a transaction for invoking a smart contract, wherein the transaction is a first transaction initiated by a first institution or a second transaction initiated by a second institution, and wherein parameters of the first transaction comprise a first user identity of a first user and encrypted data of the first user, and parameters of the second transaction comprise a second user identity of a second user;

updating accumulative invoking information for the smart contract based on the transaction, to obtain updated accumulative invoking information;

setting a first threshold for an amount of user identities received in the updated accumulative invoking information;

determining that the updated accumulative invoking information satisfies an execution condition for the smart contract in response to determining that the amount of the user identities reaches the first threshold;

in response to determining that the updated accumulative invoking information satisfies the execution condition, executing the smart contract to obtain a user verification result, wherein the user verification result is obtained by executing the smart contract to verify data of the second user; and sending the user verification result to the second institution.

14. The computer-implemented system of claim 13, wherein the first user identity comprises a first account registered by or assigned to the first user by the first institution in response to the first user initiating an operation at the first institution, and wherein the second user identity comprises a second account registered by or assigned to the second user by the first institution in response to the second user initiating an operation at the first institution.

15. The computer-implemented system of claim 13, wherein determining that the updated accumulative invoking information satisfies the execution condition comprises:

determining whether transaction parameters of the updated accumulative invoking information satisfy a transaction parameter condition comprised in the execution condition; and in response to determining that the transaction parameters of the updated accumulative invoking information satisfy the transaction parameter condition, executing the smart contract.

16. The computer-implemented system of claim 13, wherein determining that the updated accumulative invoking information satisfies the execution condition comprises:

determining whether transaction initiator identity information in the updated accumulative invoking information satisfies an identity condition comprised in the execution condition, wherein the transaction initiator identity information is associated with an invoker for the smart contract.

17. The computer-implemented system of claim 13, wherein determining that the updated accumulative invoking information satisfies the execution condition comprises:

setting a second threshold for an amount of transactions received in the updated accumulative invoking information; and determining whether the amount of the transactions reaches the second threshold.

\* \* \* \* \*